United States Patent
Yamasaki et al.

(10) Patent No.: US 11,177,485 B2
(45) Date of Patent: Nov. 16, 2021

(54) TERMINAL PLATE FOR FUEL CELL

(71) Applicant: TOYOTA JIDOSHA KABUSHIKI KAISHA, Toyota (JP)

(72) Inventors: Takenori Yamasaki, Toyota (JP); Kenji Sato, Kasugai (JP); Takuya Kurihara, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 277 days.

(21) Appl. No.: 16/416,862

(22) Filed: May 20, 2019

(65) Prior Publication Data

US 2019/0363374 A1    Nov. 28, 2019

(30) Foreign Application Priority Data

May 24, 2018   (JP) .............................. JP2018-099458

(51) Int. Cl.
| | | |
|---|---|---|
| *H01M 8/0228* | (2016.01) | |
| *H01M 8/0221* | (2016.01) | |
| *H01M 8/0206* | (2016.01) | |
| *H01M 8/2465* | (2016.01) | |
| *H01M 8/2483* | (2016.01) | |

(52) U.S. Cl.
CPC ....... *H01M 8/0228* (2013.01); *H01M 8/0206* (2013.01); *H01M 8/0221* (2013.01); *H01M 8/2465* (2013.01); *H01M 8/2483* (2016.02)

(58) Field of Classification Search
None
See application file for complete search history.

(56) References Cited

U.S. PATENT DOCUMENTS

| | | | | |
|---|---|---|---|---|
| 6,793,544 | B2 * | 9/2004 | Brady ................. | H01M 8/0206 |
| | | | | 439/886 |
| 2004/0137299 | A1 * | 7/2004 | Mazza ................ | H01M 8/2483 |
| | | | | 429/514 |
| 2005/0260479 | A1 * | 11/2005 | Raiser ................. | H01M 8/2465 |
| | | | | 429/434 |
| 2016/0329577 | A1 | 11/2016 | Shizuku | |

FOREIGN PATENT DOCUMENTS

| | | | |
|---|---|---|---|
| JP | 2004-031010 | * | 1/2004 |
| JP | 2015-088294 | | 5/2015 |
| JP | 2018-163752 | * | 10/2018 |

* cited by examiner

*Primary Examiner* — Jonathan Crepeau
(74) *Attorney, Agent, or Firm* — Finnegan, Henderson, Farabow, Garrett & Dunner, LLP

(57) ABSTRACT

A terminal plate for fuel cell includes a core plate that includes a first opening portion at a position corresponding to a manifold, a cover plate that includes a second opening portion at a position corresponding to the manifold, and is arranged at least on a surface on a side of a unit fuel cell of the core plate, and a resin sheet that is interposed between the core plate and the cover plate, includes a third opening portion at a position corresponding to the manifold, and is arranged at a position facing a manifold forming area. The core plate includes a first metal plate that is arranged at a position facing a power generating area, and a second metal plate that is joined to the first metal plate, includes the first opening portion, and is arranged at a position facing the manifold forming area. Each of the cover plate and the second metal plate is made of a metal material higher in corrosion resistance than the first metal plate.

5 Claims, 13 Drawing Sheets

TERMINAL PLATE FOR FUEL CELL

CROSS-REFERENCE TO RELATED APPLICATION

This application claims priority to Japanese Patent Application No. 2018-99458, filed May 24, 2018, the disclosure of which is incorporated by reference herein in its entirety.

BACKGROUND

1. Field

The present disclosure relates to a terminal plate for fuel cell.

2. Related Art

As a structure of a terminal plate for fuel cell, Patent Literature 1, for example, discloses a structure in which an aluminum or copper core plate with high conductivity is sandwiched by titanium plates with high corrosion resistance.

Patent Literature 1: JP2015-88294A

In the structure of the terminal plate disclosed in Patent Literature 1, the front surface of the core plate is covered by a titanium plate, while the side surface thereof is exposed from the titanium plate. If the side surface of the core plate is exposed into manifolds penetrating the terminal plate, water flowing in the manifolds contacts the side surface of the core plate, causing corrosion. Thus, in Patent Literature 1, the side surface of the core plate is covered by an adhesive seal member, which makes the structure complicated.

SUMMARY

In an aspect of the present disclosure, provided is a terminal plate for fuel cell that is arranged to face a plate-like unit fuel cell including a power generating area with an electrolyte membrane and a manifold forming area with a manifold. The terminal plate for fuel cell includes a core plate that includes a first opening portion at a position corresponding to the manifold in an arrangement state with the terminal plate for fuel cell facing the unit fuel cell; a cover plate that includes a second opening portion at a position corresponding to the manifold in the arrangement state, and is arranged at least on a surface on a side of the unit fuel cell of the core plate; and a resin sheet that is interposed between the core plate and the cover plate, includes a third opening portion at a position corresponding to the manifold in the arrangement state, and is arranged at a position facing the manifold forming area. In addition, the core plate includes a first metal plate that is arranged at a position facing the power generating area in the arrangement state, and a second metal plate that is joined to the first metal plate, includes the first opening portion, and is arranged at a position facing the manifold forming area in the arrangement state, and each of the cover plate and the second metal plate is made of a metal material higher in corrosion resistance than the first metal plate.

DETAILED DESCRIPTION

A. First Embodiment

Figure 1:
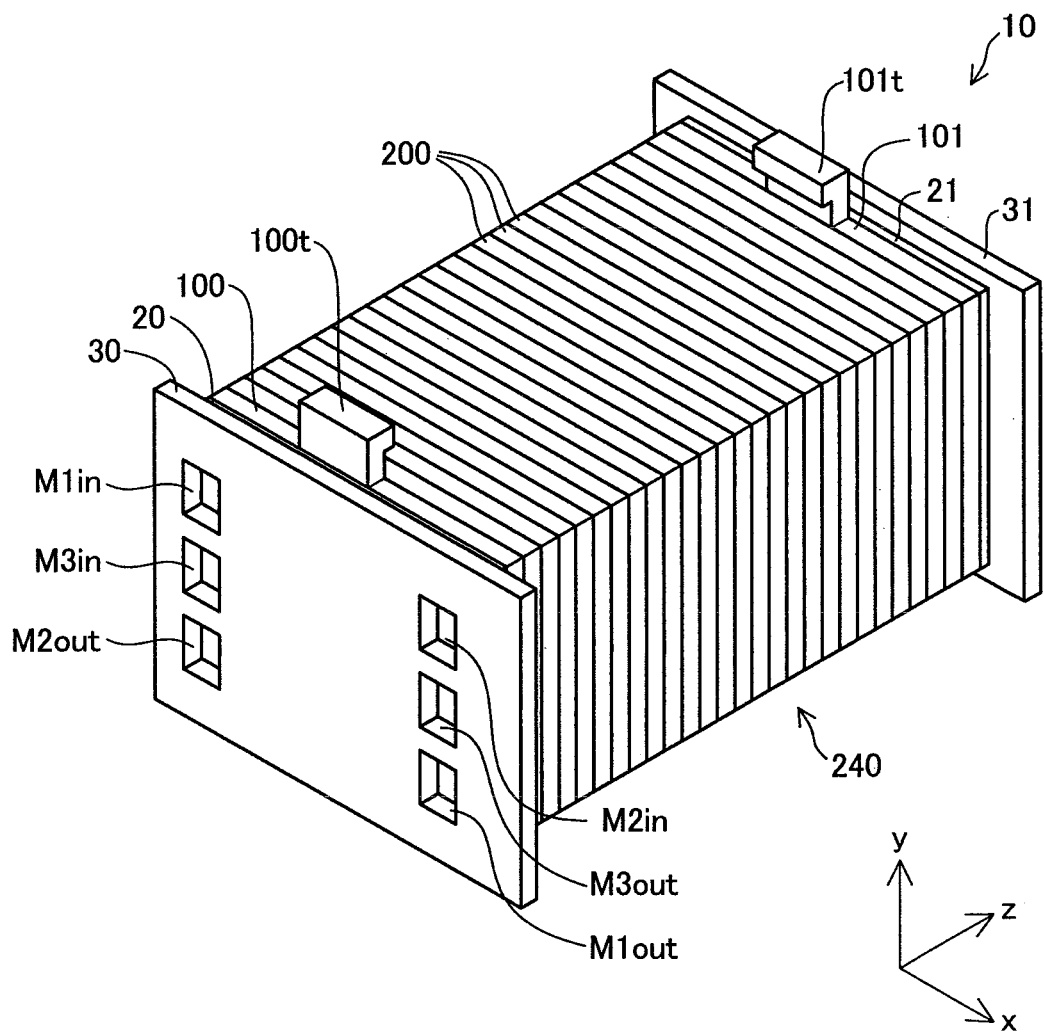
FIG. 1 is a perspective view illustrating a schematic configuration of a fuel cell.

FIG. 1 is a perspective view illustrating a schematic configuration of a fuel cell 10 including a terminal plate 100 for fuel cell according to an embodiment of the present disclosure. An x-direction, a y-direction, and a z-direction illustrated in FIG. 1 correspond respectively to an x-direction, a y-direction, and a z-direction illustrated in the other diagrams. These directions are orthogonal to one another. In the following, the +y-direction corresponds to an upward direction, and the −y-direction corresponds to a downward direction. Moreover, the direction along the x-direction is referred to as a right-left direction, and the +z-direction side of the terminal plate 100 is referred to as a front surface side, while the −z-direction side is referred to as a back surface side. The fuel cell 10 is provided in a movable body such as a vehicle, for example, and is used as a power source for the movable body. Moreover, the fuel cell 10 may be used as a stationary power source.

The fuel cell 10 includes a stacked body 240 in which a plurality of plate-like unit fuel cells 200 are stacked, a pair of terminal plates 100, 101, a pair of insulating plates 20, 21, and a pair of end plates 30, 31. The fuel cell 10 is formed by stacking the end plate 30, the insulating plate 20, the terminal plate 100, the stacked body 240, the terminal plate 101, the insulating plate 21, and the end plate 31 in this order. The fuel cell 10 is held by a fastening member (not illustrated) with a fastening pressure applied in a stacking direction of the unit fuel cells 200.

The fuel cell 10 is a solid polymer type fuel cell that receives supply of fuel gas containing hydrogen and oxidization gas containing oxygen and generates power. The power generated by electrochemical reaction in the fuel cell 10 is collected by the terminal plates 100, 101, and extracted to an exterior load from terminals 100t, 101t provided on the terminal plates 100, 101. The insulating plates 20, 21 are made of an insulating material such as rubber or resin. The end plates 30, 31 are made of metal such as stainless steel.

The fuel cell 10 includes a plurality of manifolds M1in to M3in, M1out to M3out penetrating the end plate 30, the insulating plate 20, the terminal plate 100, and the stacked body 240 in a stacking direction (z-direction). The manifold M1in is a fuel gas supply manifold to distribute fuel gas to the unit fuel cells 200. The manifold M2in is an oxidization gas supply manifold to distribute oxidization gas to the unit fuel cells 200. The manifold M3in is a refrigerant supply manifold to distribute a refrigerant to refrigerant flow paths formed between the unit fuel cells 200 and between the unit fuel cell 200 and the terminal plate 100. The manifold M1out is a fuel gas discharge manifold to discharge off gas of fuel gas from the unit fuel cells 200. The manifold M2out is an oxidization gas discharge manifold to discharge off gas of oxidization gas from the unit fuel cells 200. The manifold M3out is a refrigerant discharge manifold to discharge a refrigerant from refrigerant flow paths formed between the unit fuel cells 200 and between the unit fuel cell 200 and the terminal plate 100. In the first embodiment, the terminal plate 101, the insulating plate 21, and the end plate 31 do not have opening portions at positions corresponding to the manifolds. For example, the terminal plate 101 is formed as a flat-plate-like aluminum plate with the terminal 101t.

Figure 2:
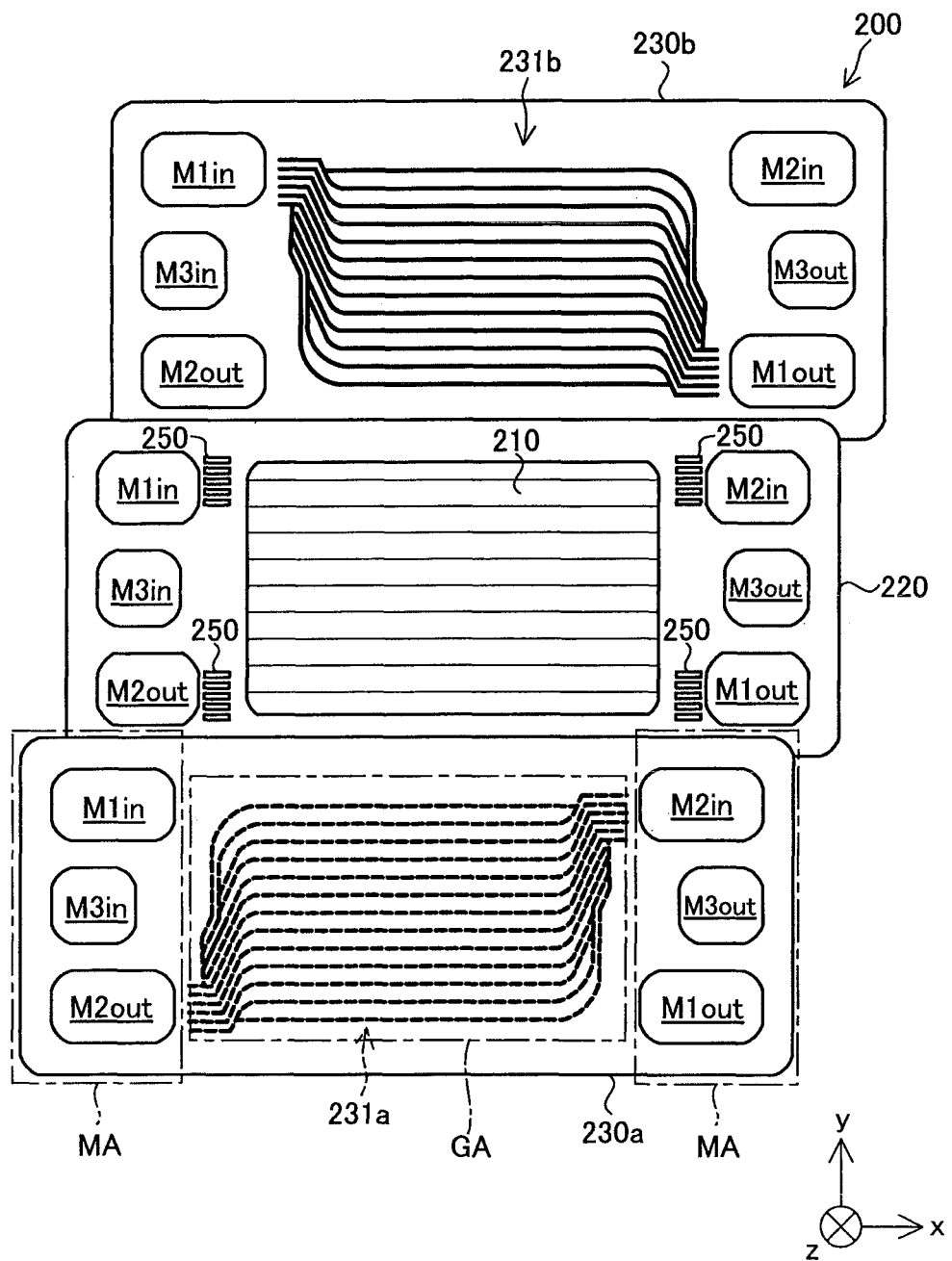
FIG. 2 is an exploded view illustrating a schematic configuration of a unit fuel cell.

FIG. 2 is an exploded view illustrating a schematic configuration of the unit fuel cell 200. The unit fuel cell 200 includes a power generating element 210, a resin frame 220, and a pair of separators 230a, 230b. Each of the resin frame 220 and the separators 230a, 230b has opening portions at positions corresponding to the six manifolds M1in to M3in, and M1out to M3out that are illustrated in FIG. 1.

The power generating element 210 includes an electrolyte membrane, catalyst layers formed to be adjacent to both surfaces of the electrolyte membrane, and gas diffusion layers. The electrolyte membrane is a solid polymer thin film exhibiting preferable proton conductivity in a wet state. The electrolyte membrane is formed from a fluororesin ion exchange membrane, for example. The catalyst layer contains a catalyst accelerating chemical reaction between hydrogen and oxygen, and contains carbon particles carrying the catalyst. The combination of the electrolyte membrane and the catalyst layer is also referred to as a membrane electrode assembly (MEA). Each of the gas diffusion layers is provided adjacent to a surface on the catalyst layer side. The gas diffusion layer is a layer for diffusing reaction gas used in electrode reaction along a surface direction of the electrolyte membrane, and is formed from a porous diffusion substrate. As the diffusion substrate, there is used a porous substrate having conductivity and gas diffusion property such as a carbon fiber substrate, a graphite fiber substrate, or foamed metal, for example. The combination of the electrolyte membrane, the catalyst layer, and the gas diffusion layer is also referred to as a membrane electrode gas-diffusion-layer assembly (MEGA).

The resin frame 220 is a frame-shaped resin member arranged around the power generating element 210. In the first embodiment, polyethylene terephthalate (PET) is used as the resin member, for example. However, the resin member may be other various kinds of thermoplastic resin members such as polypropylene or polyethylene. The resin frame 220 includes slit-like gas introduction paths 250 between the manifolds and the power generating element 210 to introduce or discharge fuel gas or oxidization gas from the manifolds. The gas introduction paths 250 are formed to penetrate the resin frame 220.

The separators 230a, 230b are stacked on the resin frame 220 to sandwich the power generating element 210 and the resin frame 220. In the first embodiment, the separators 230a, 230b have conductivity and are made of titanium with high corrosion resistance. The separators 230a, 230b include gas flow paths 231a, 231b formed from concave-convex-shaped grooves at positions corresponding to the power generating element 210 and the gas introduction paths 250. One end on the manifold side of the gas introduction path 250 is exposed into the manifold in the state where the resin frame 220 and the separators 230a, 230b are stacked. The other end on the power generating element 210 side of the gas introduction path 250 is connected to the gas flow path 231a or the gas flow path 231b. Thus, gas flowing in the manifolds is supplied to the power generating element 210 through the gas introduction paths 250 and the gas flow paths 231a, 231b.

In the following, a "power generating area GA" is an area where the power generating element 210 (electrolyte membrane) is provided in a plane surface direction (xy direction) of the unit fuel cell 200. A "manifold forming area MA" is an area where the manifolds are formed more on the outer peripheral side than the power generating area GA. Note that the configuration of the unit fuel cell 200 illustrated in FIG. 2 is an example, and the configuration is not limited to one illustrated in FIG. 2 as long as the unit fuel cell includes the power generating area GA and the manifold forming area MA.

Figure 3:
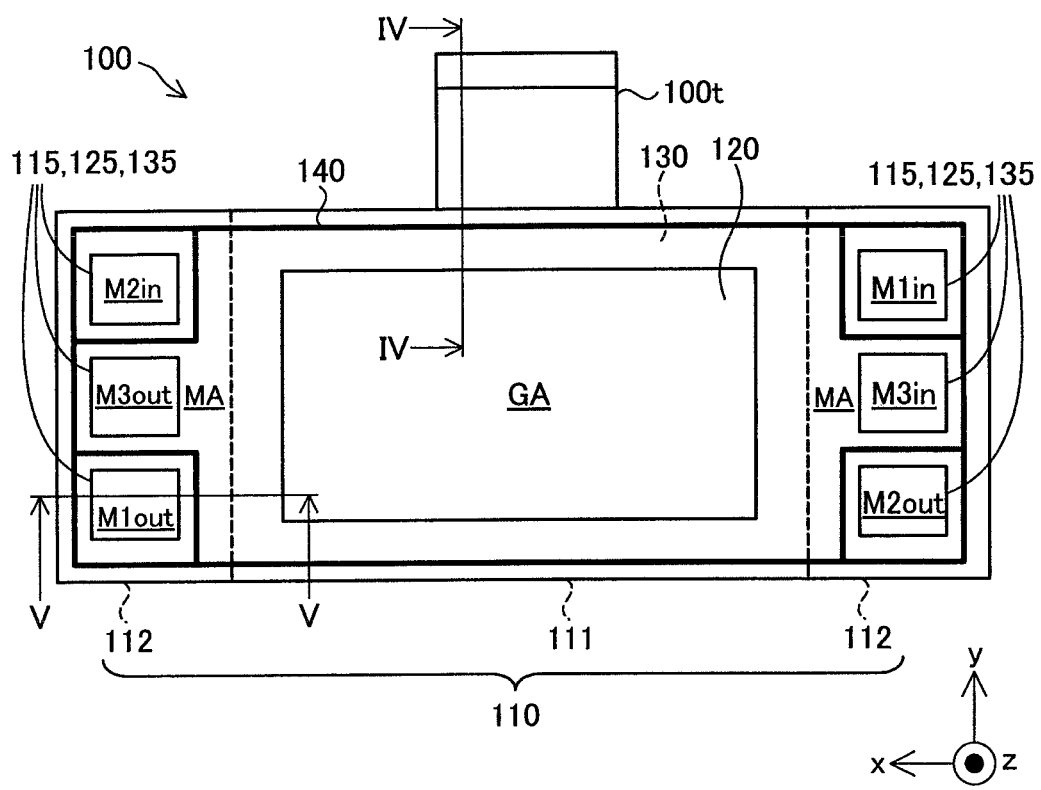
FIG. 3 is a front view illustrating a schematic configuration of a terminal plate.
Figure 4:
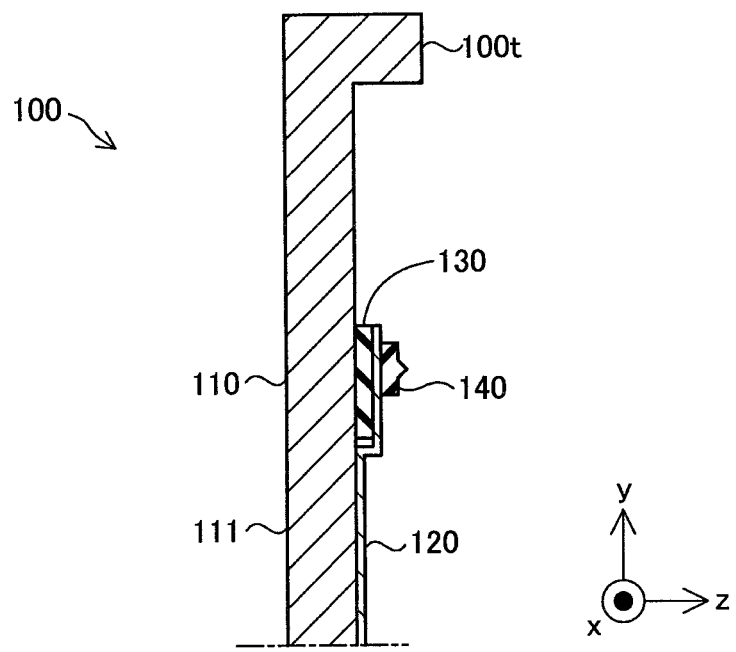
FIG. 4 is a cut part end view taken from line IV-IV of FIG. 3.
Figure 5:
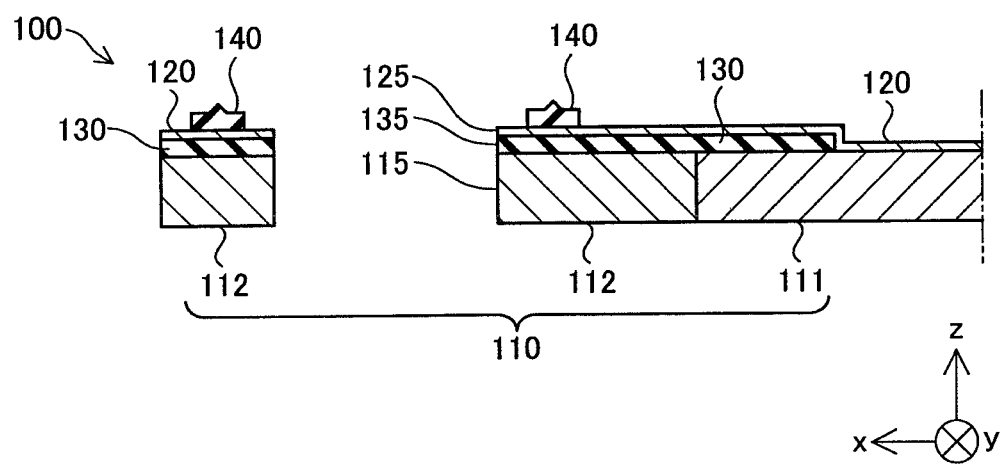
FIG. 5 is a cut part end view taken from line V-V of FIG. 3.

FIG. 3 is a front view illustrating a schematic configuration of the terminal plate 100. FIG. 4 is a cut part end view taken from line IV-IV of FIG. 3. FIG. 5 is a cut part end view taken from line V-V of FIG. 3. FIG. 3 illustrates a state of the terminal 100 viewed from the stacked body 240 side. In FIG. 3, a first opening portion 115, a second opening portion 125, and a third opening portion 135, which are described later, overlap at the same position. Thus, FIG. 3 illustrates them all together. Moreover, in FIG. 3, members not viewed from the front side are represented by broken leading lines and reference symbols.

As illustrated in FIGS. 4 and 5, the terminal plate 100 includes a core plate 110, a cover plate 120, and a resin sheet 130. In the following, the state in which the terminal plate 100 is arranged to face the unit fuel cell 200 (state illustrated in FIG. 1) is referred to as an "arrangement state". As illustrated in FIGS. 3 to 5, there is arranged, on the cover plate 120, a gasket 140 for sealing the manifolds and the refrigerant flow paths formed between the adjacent unit fuel cells 200. The gasket 140 may be arranged on the unit fuel cell 200 adjacent to the terminal plate 100, and may not be arranged on the terminal plate 100.

As illustrated in FIG. 3, the core plate 110 is a substantially rectangular parallelepiped member. As illustrated in FIG. 3 and FIG. 5, the core plate 110 includes a first metal plate 111 and second metal plates 112. The first metal plate 111 is arranged at a position facing the power generating area GA in the above-described arrangement state. The "position facing the power generating area GA" may not be a position precisely facing the power generating area GA, and may be a position facing an area including the power generating area GA. As illustrated in FIG. 4, in the first embodiment, the terminal 100t is formed on the upper part of the first metal plate 111. As illustrated in FIG. 3, the two second metal plates 112 are joined to both ends of the first metal plate 111 to sandwich the first metal plate 111 from the right and left. In the first embodiment, the second metal plates 112 are laser-welded to the first metal plate 111. The second metal plates 112 may be joined to the first metal plate 111 with an adhesive. The second metal plate 112 is arranged at a position facing the manifold forming area MA in the above-described arrangement state. The "position facing the manifold forming area MA" may not be a position precisely facing the manifold forming area MA, and may be a position facing an area including the manifold forming area MA. The second metal plate 112 includes, at positions corresponding to the manifolds, the first opening portions 115 penetrating the second metal plate 112.

In the first embodiment, the second metal plate 112 is made of a metal material higher in corrosion resistance than the first metal plate 111. To be more specific, in the first embodiment, the first metal plate 111 is made of copper with high conductivity, while the second metal plate 112 is made of titanium lower in conductivity than copper but higher in corrosion resistance than copper. As is well-known, titanium exhibits high corrosion resistance with an oxide film formed on the surface. The first metal plate 111 may be made of silver or aluminum, while the second metal plate 112 may be made of stainless steel exhibiting high corrosion resistance by the oxide film, for example. The corrosion resistance of the first metal plate 111 and the second metal plate 112 may be evaluated on the basis of an electrochemical test in which a current is applied to a sample immersed in hydrofluoric acid or the like, for example. The two metal plates 112 joined to the first metal plate 111 may be made of materials different from each other as long as they have higher corrosion resistance than the first metal plate 111. For example, one of the two second metal plates 112 may be made of titanium, and the other may be made of stainless steel, for example.

The cover plate 120 is a substantially rectangular parallelepiped member, and is a metal plate arranged at least on the surface on the unit fuel cell 200 side of the core plate 110 in the above-described arrangement state. The cover plate 120 includes, at positions corresponding to the manifolds, the second opening portions 125 penetrating the cover plate 120. The cover plate 120 covers the core plate 110 and is in contact with the core plate 110 in the power generating area GA. In the first embodiment, the resin sheet 130 described later is adhered to the periphery of the surface on the core plate 110 side of the cover plate 120. Thus, a center part of the cover plate 120 is recessed to the core plate 110 side so that the center part of the cover plate 120 is in contact with the core plate 110. To enhance conductivity of the terminal plate 100, a thickness of the cover plate 120 is preferably smaller than a thickness of the core plate 110. The thickness of the cover plate 120 may be 1/30 to 1/10 of the thickness of the core plate 110, for example, and is 1/20 in the first embodiment.

In the first embodiment, the cover plate 120 is made of a metal material higher in corrosion resistance than the first metal plate 111. To be more specific, in the first embodiment, the cover plate 120 is made of titanium that is the same metal material as the second metal plate 112. In this manner, in the first embodiment, the cover plate 120 and the second metal plate 112 are made of the same metal material, which reduces manufacturing costs of the terminal plate 100. However, the cover plate 120 may be made of stainless steel, for example, instead of titanium. The cover plate 120 and the second metal plate 112 may be made of materials different from each other as long as they have higher corrosion resistance than the first metal plate 111. For example, the cover plate 120 may be made of titanium, and the second metal plate 112 may be made of stainless steel.

The resin sheet 130 is a sheet member made of resin interposed between the core plate 110 and the cover plate 120 to adhere them. The resin sheet 130 seals between the core plate 110 and the cover plate 120. The resin sheet 130 is arranged at a position facing the manifold forming area MA in the above-described arrangement state. The resin sheet 130 includes, at positions facing the manifolds, the third opening portions 135 penetrating the resin sheet 130.

In the first embodiment, the resin sheet 130 has a frame shape, and is arranged corresponding to not only the manifold forming area MA but also an area on the upper side of the power generating area GA (see FIG. 4) and an area on the lower side thereof. As the resin sheet 130, there may be used a modified polyolefin sheet having adhesiveness. A thickness of the resin sheet 130 is twice or three times the thickness of the cover plate 120, for example.

The above-described terminal plate 100 may be produced by firstly joining the second metal plates 112 to the first metal plate 111 to form the core plate 110, arranging the frame-shaped resin sheet 130 on one surface of the formed core plate 110, arranging the cover plate 120 on the resin sheet 130, and performing thermocompression bonding, for example.

In the above-described terminal plate 100 of the first embodiment, among the first metal plate 111 and the second metal plates 112 forming the core plate 110, the second metal plates 112 having the first opening portions 115 connecting to the manifolds are made of a metal material high in corrosion resistance. Thus, it is not necessary to cover the side surface of the core plate 110 exposed into the manifold with a resin material or the like. This consequently enables a simple structure of the terminal plate 100 in which the core plate 110 and the cover plate 120 are joined to each other through the resin sheet 130, and reduces the manufacturing costs of the terminal plate 100 and the fuel cell 10 using the terminal plate 100.

Moreover, in the terminal plate 100 of the first embodiment, the second metal plate 112 forming the core plate 110 and the cover plate 120 are made of the same metal material, and thus the linear expansion coefficients of the second metal plate 112 and the cover plate 120 are equal. As a result, even if temperatures of the core plate 110 and the cover plate 120 vary in thermocompression bonding thereof through the resin sheet 130, it is possible to prevent shearing stress applied on the resin sheet 130 between the second metal plate 112 and the cover plate 120 due to a linear expansion difference between the second metal plate 112 and the cover plate 120. Consequently, it is possible to prevent rupture of the resin sheet 130 in the manufacturing of the terminal plate 100, and the like.

B. Second Embodiment

Figure 6:
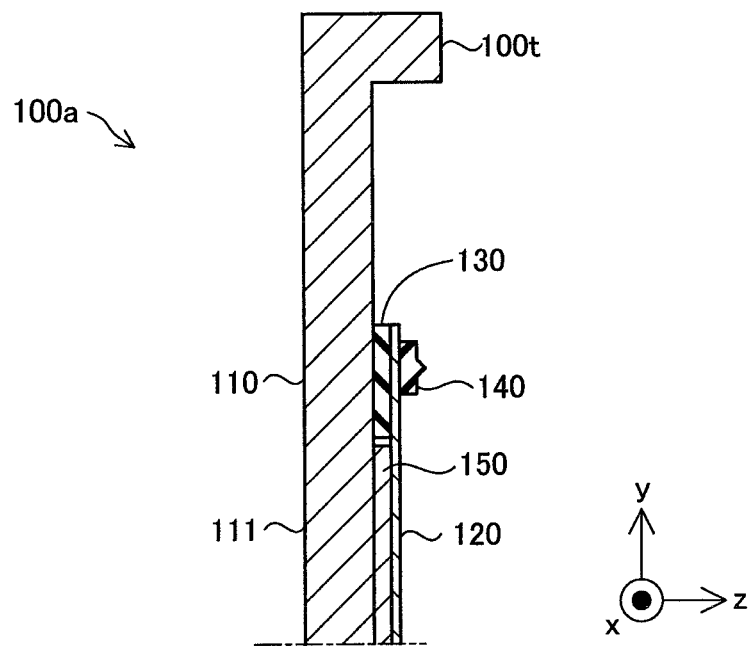
FIG. 6 is an explanatory diagram illustrating a structure of a terminal plate according to a second embodiment.
Figure 7:
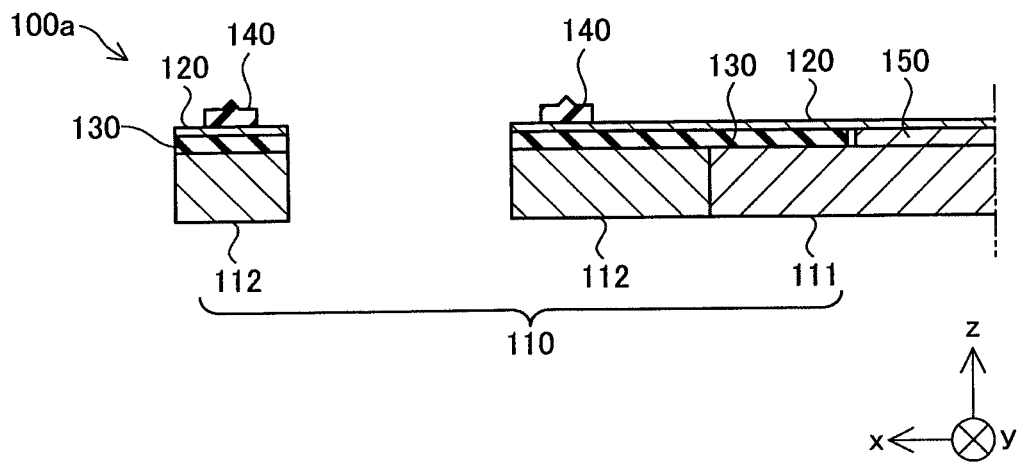
FIG. 7 is an explanatory diagram illustrating a structure of the terminal plate according to the second embodiment.

FIG. 6 and FIG. 7 are explanatory diagrams illustrating a structure of a terminal plate 100a according to a second embodiment. FIG. 6 illustrates a section of the terminal plate 100a corresponding to FIG. 4. FIG. 7 illustrates a section of the terminal plate 100a corresponding to FIG. 5. The terminal plate 100a of the second embodiment is different from the terminal plate 100 of the first embodiment in the aspect that a spacer 150 having conductivity is provided.

In the second embodiment, the spacer 150 is interposed between the core plate 110 and the cover plate 120, and is arranged at a position facing the power generating area GA in the above-described arrangement state. The spacer 150 is formed to have the substantially same thickness as the resin sheet 130. The spacer 150 is preferably made of a material higher in conductivity than the cover plate 120. In the second embodiment, the spacer 150 is made of copper that is the same metal material of the first metal plate 111 of the core plate 110. Thus, the arrangement of the spacer 150 may prevent deterioration of conductivity in the terminal plate 100a. The spacer 150 may be made of aluminum, for example, instead of copper.

In the above-described terminal plate 100a of the second embodiment, the spacer 150 is arranged between the core plate 110 and the cover plate 120, which unifies the thickness of the terminal plate 100. Therefore, it is not necessary to form a recess in the cover plate 120 to secure a contact with the core plate 110. This enables a simple structure of the cover plate 120.

Moreover, in the second embodiment, it is not necessary to form a recess in the cover plate 120, whereby it is possible to adopt, as the cover plate 120, a separator 230b for the unit fuel cell 200 made of titanium as it is. In this manner, the cover plate 120 and the separator 230b are made common, which considerably reduces the manufacturing costs of the terminal plate 100. In addition, if the separator 230b for the unit fuel cell 200 is adopted as the cover plate 120, it is possible to easily form, between the terminal plate 100 and the unit fuel cell 200, a cooling flow path with the same structure as the cooling flow path formed between the unit fuel cells 200.

C. Third Embodiment

Figure 8:
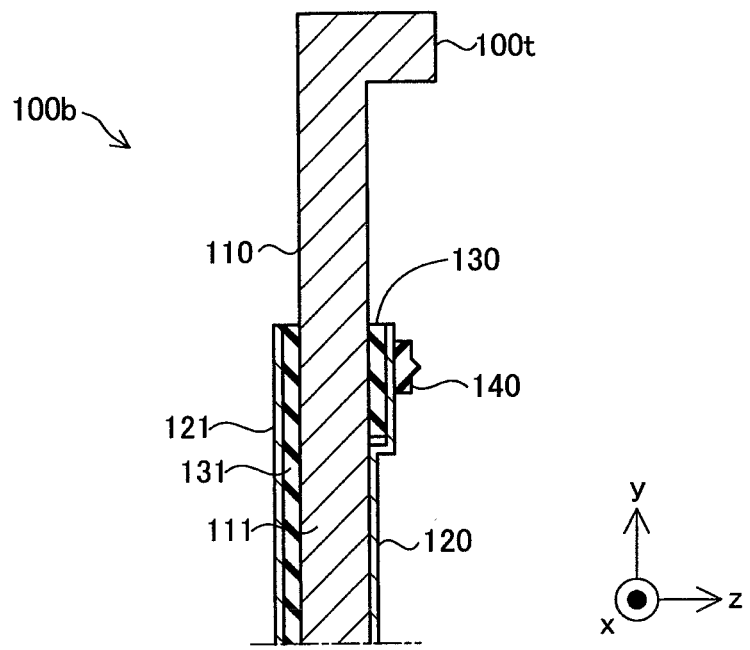
FIG. 8 is an explanatory diagram illustrating a structure of a terminal plate according to a third embodiment.
Figure 9:
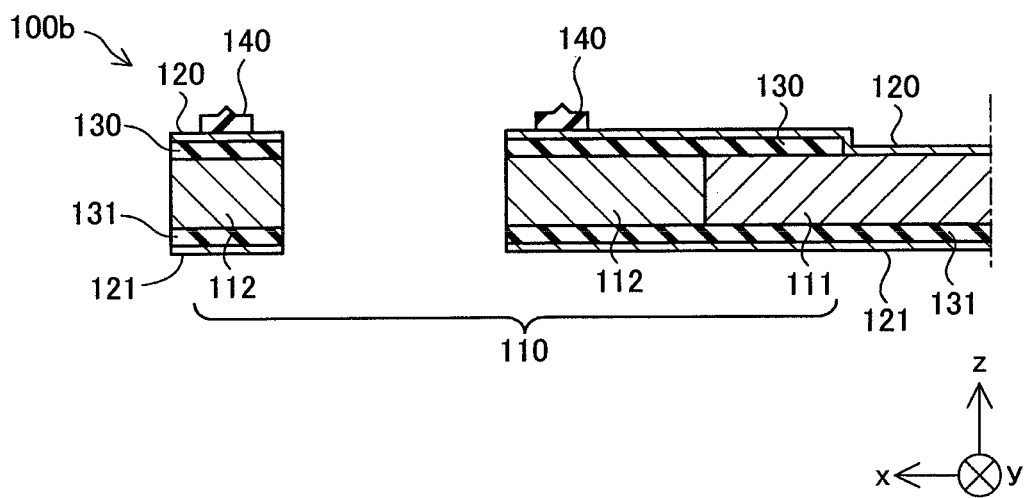
FIG. 9 is an explanatory diagram illustrating a structure of the terminal plate according to the third embodiment.

FIG. 8 and FIG. 9 are explanatory diagrams illustrating a structure of a terminal plate 100b according to a third embodiment. FIG. 8 illustrates a section of the terminal plate. 100b corresponding to FIG. 4. FIG. 9 illustrates a section of the terminal plate 100b corresponding to FIG. 5. The terminal plate 100b of the third embodiment is different from the first embodiment in the aspect that a resin sheet 131 and a cover plate 121 are arranged also on the back surface side (end plate 30 side) of the core plate 110 in the above-described arrangement state.

In the third embodiment, the resin sheet 131 arranged on the back surface side of the core plate 110 is arranged also at a part facing the power generating area GA. That is, in the third embodiment, the resin sheet 131 is not frame-shaped, and covers the entire back surface of the core plate 110 except the first opening portions 115. The core plate 121 also covers the entire back surface of the core plate 110 except the first opening portions 115, through the resin sheet 131.

In the above-described terminal plate 100b of the third embodiment, the resin sheet 131 and the cover plate 121 are arranged also on the back surface of the core plate 110, which enhances the strength of the terminal plate 100b. Moreover, the resin sheet 131 and the cover plate 121 cover the entire back surface of the core plate 110 except the first opening portions 115, which prevents corrosion on the back surface side of the first metal plate 111 forming the core plate 110. Therefore, it is possible, for example, to arrange a refrigerant flow path between the terminal plate 100b and the insulating plate 20, and thus cool the terminal plate 100 efficiently.

D. Fourth Embodiment

Figure 10:
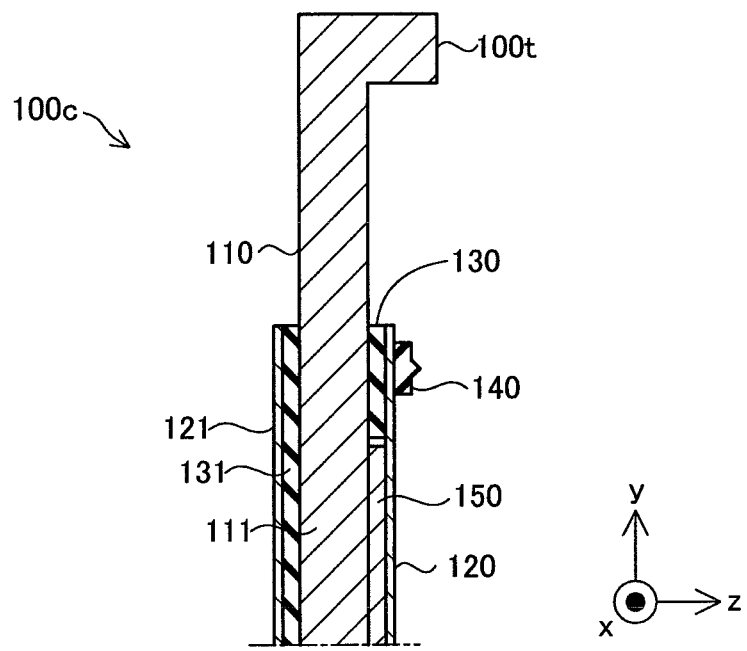
FIG. 10 is an explanatory diagram illustrating a structure of a terminal plate according to a fourth embodiment.
Figure 11:
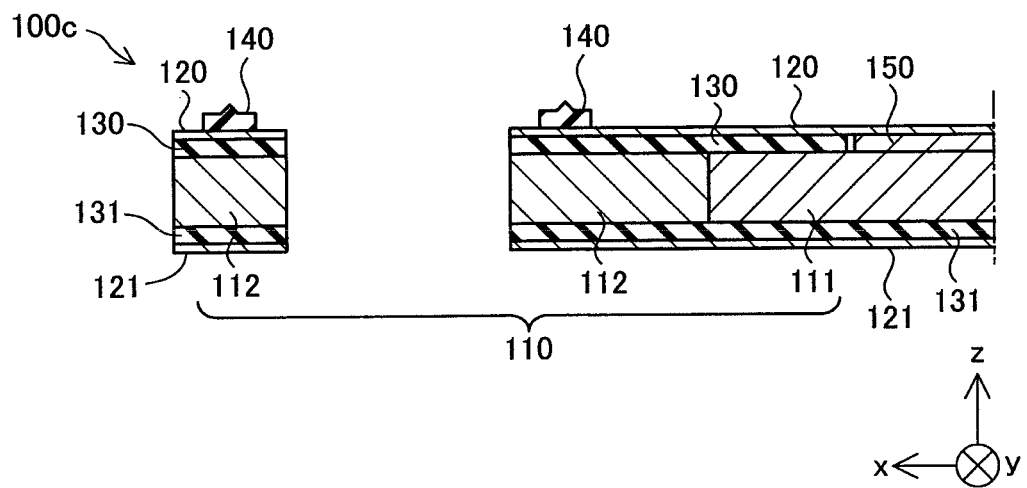
FIG. 11 is an explanatory diagram illustrating a structure of the terminal plate according to the fourth embodiment.

FIG. 10 and FIG. 11 are explanatory diagrams illustrating a structure of a terminal plate 100c according to a fourth embodiment. FIG. 10 illustrates a section of the terminal plate 100c corresponding to FIG. 4. FIG. 11 illustrates a section of the terminal plate 100c corresponding to FIG. 5. The terminal plate 100c of the fourth embodiment has the structures of both the terminal plate 100a of the second embodiment and the terminal plate 100b of the third embodiment. That is, the terminal plate 100c of the fourth embodiment includes the spacer 150 between the core plate 110 and the cover plate 120, and the resin sheet 131 and the cover plate 121 are arranged on the back surface side of the core plate 110. The terminal plate 100c of the fourth embodiment with such a structure exerts the same effects as all of the terminal plates 100, 100a, 100b of the first embodiment to the third embodiment.

E. Fifth Embodiment

Figure 12:
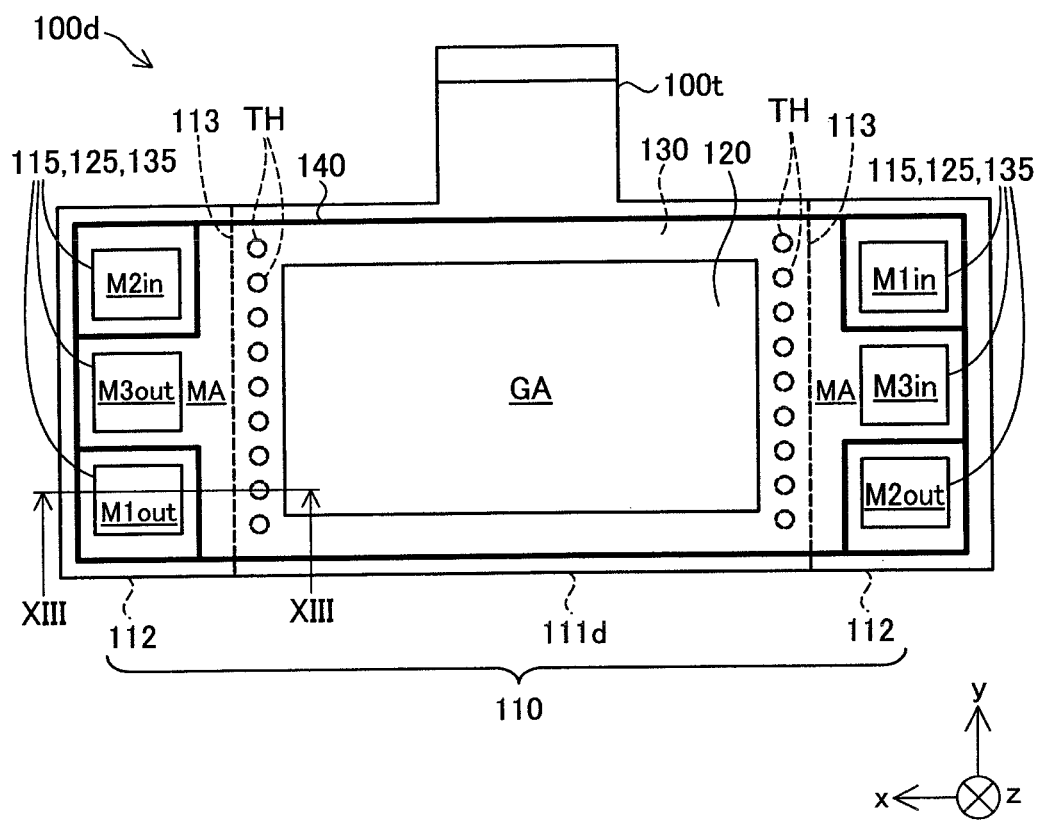
FIG. 12 is a front view illustrating a schematic configuration of a terminal plate according to a fifth embodiment.
Figure 13:
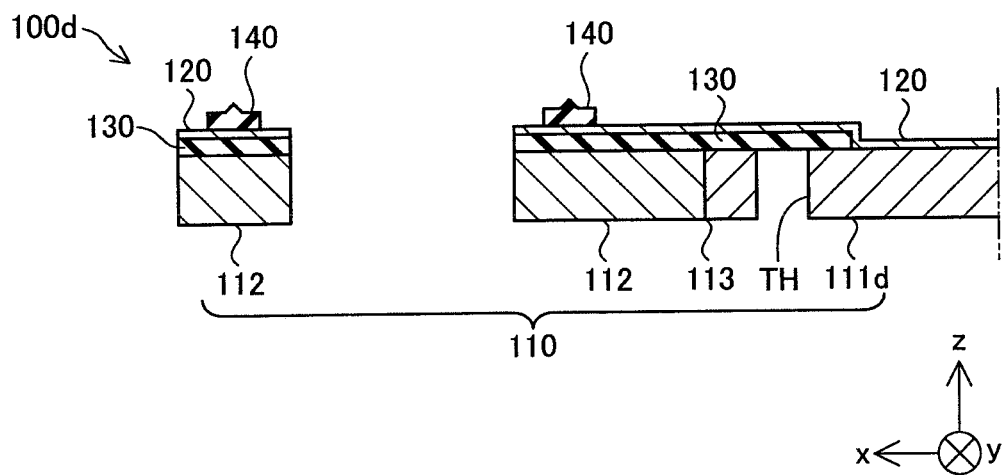
FIG. 13 is a cut part end view taken from line XIII-XIII of FIG. 12.

FIG. 12 is a front view illustrating a schematic configuration of a terminal plate 100d according to a fifth embodiment. FIG. 13 is a cut part end view taken from line XIII-XIII of FIG. 12. In the fifth embodiment, a first metal plate 111d forming the terminal plate 100d has through holes TH in the vicinity of the second metal plates 112. To be more specific, the first metal plate 111d has a plurality of through holes TH between a joint portion 113 of the first metal plate 111d and the second metal plate 112 and the power generating area GA, along the joint portion 113.

In the fifth embodiment, a diameter of the through hole TH is larger than a thickness of the first metal plate 111d, and is twice to three times the thickness of the first metal plate 111d, for example. Moreover, the through holes TH are arranged with the same intervals of about twice or three times the diameter of the through hole TH. Moreover, a distance between the joint portion 113 and the through hole TH is one to three times the diameter of the through hole TH. Note that the form of the through hole TH is not limited to being circular and may be polygonal.

On the front surface side of the core plate 110, there are arranged the resin sheet 130 and the cover plate 120 to cover the through holes TH. The back surface side of the core plate 110 may be covered by the resin sheet 131 and the cover plate 121, similarly to the third embodiment and the fourth embodiment.

In the above-described terminal plate 100d of the fifth embodiment, even if the linear expansion difference between the first metal plate 111d and the second metal plate 112 causes the first metal plate 111d to tend to shrink and apply tensile force on the joint portion 113 when a temperature varies from a high temperature to a low temperature, in thermocompression bonding and the like during the manufacturing of the terminal plate 100d, the through holes TH provided in the vicinity of the joint portion 113 of the first metal plate 111d facilitate deformation around the through holes TH, which prevents stress on the joint portion 113. Therefore, in the fifth embodiment, it is possible to prevent separation between the first metal plate 111d and the second metal plate 112 in the manufacturing of the terminal plate 100d, and the like, and enhance the strength of the terminal plate 100d.

F. Other Embodiments

In the above-described embodiments, all manifolds are open on the end plate 30 arranged on one end side of the fuel cell 10. However, the embodiments may have different configurations. For example, at least a part of the above-described six manifolds may be open on the end plate 31 side. In this case, the terminal plate 101 preferably has the same configuration as the terminal plate 100 except the positions of the opening portions formed corresponding to the manifolds.

In the above-described embodiments, the manifolds are formed at positions sandwiching the power generating area GA in a right-left direction of the fuel cell 10. However, at least a part of the manifolds may be formed on the upper side or the lower side than the power generating area GA in a vertical direction of the fuel cell 10.

G. Other Embodiments

The present disclosure is not limited to the above-described embodiments, and may be achieved by various configurations without departing from the scope of the disclosure. For example, the technical features in the embodiments, the examples, and the modifications may be appropriately replaced or combined in order to solve a part or all of the above-described problems or achieve a part or all of the above-described effects. Moreover, unless the technical features are explained as necessary in the specification, they may be deleted appropriately. For example, the present disclosure may be achieved by the aspects described in the following.

(1) In an aspect of the present disclosure, provided is a terminal plate for fuel cell that is arranged to face a plate-like unit fuel cell including a power generating area with an electrolyte membrane and a manifold forming area with a manifold. The terminal plate for fuel cell includes a core plate that includes a first opening portion at a position corresponding to the manifold in an arrangement state with the terminal plate for fuel cell facing the unit fuel cell; a cover plate that includes a second opening portion at a position corresponding to the manifold in the arrangement state, and is arranged at least on a surface on a side of the unit fuel cell of the core plate; and a resin sheet that is interposed between the core plate and the cover plate, includes a third opening portion at a position corresponding to the manifold in the arrangement state, and is arranged at a position facing the manifold forming area. The core plate includes a first metal plate that is arranged at a position facing the power generating area in the arrangement state, and a second metal plate that is joined to the first metal plate, includes the first opening portion, and is arranged at a position facing the manifold forming area in the arrangement state, and each of the cover plate and the second metal plate is made of a metal material higher in corrosion resistance than the first metal plate.

In the terminal plate for fuel cell of this aspect, among the first metal plate and the second metal plate forming the core plate, the second metal plate with the first opening portions connecting to the manifolds is made of a metal material with high corrosion resistance. Thus, it is not necessary to cover the side surface of the core plate at the first opening portions with a resin material or the like. This enables the simple configuration of the terminal plate in which the core plate and the cover plate are joined through the resin sheet.

(2) In the terminal plate for fuel cell of the above-described aspect, the cover plate and the second metal plate may be made of a same metal material. In such an aspect, it is possible to prevent shearing stress applied on the resin sheet between the cover plate and the second metal plate due to a linear expansion difference between the cover plate and the second metal plate.

(3) The terminal plate for fuel cell of the above-described aspect may further include a spacer having conductivity that is interposed between the core plate and the cover plate and is arranged at a position facing the power generating area in the arrangement state. In such an aspect, it is possible to unify the thickness of the terminal plate.

(4) In the terminal plate for fuel cell of the above-described aspect, the spacer and the first metal plate may be made of a same metal material. In such an aspect, the arrangement of the spacer prevents deterioration of conductivity in the terminal plate.

(5) In the terminal plate for fuel cell of the above-described aspect, the first metal plate may include a through hole in a vicinity of the second metal plate. In such an aspect, it is possible to reduce stress applied on a joint portion of the first metal plate and the second metal plate due to a linear expansion difference between the first metal plate and the second metal plate when a temperature of the terminal plate is varied.

The present disclosure may be achieved by various aspects other than the terminal plate for fuel cell. For example, the present disclosure may be achieved by the aspects of a fuel cell with a terminal plate for fuel cell and a method of manufacturing a terminal plate for fuel cell, for example.

What is claimed is:

1. A terminal plate for fuel cell that is arranged to face a plate-like unit fuel cell including a power generating area with an electrolyte membrane and a manifold forming area with a manifold, the terminal plate for fuel cell comprising:

a core plate that includes a first opening portion at a position corresponding to the manifold in an arrangement state with the terminal plate for fuel cell facing the unit fuel cell;

a cover plate that includes a second opening portion at a position corresponding to the manifold in the arrangement state, and is arranged at least on a surface of the core plate, the surface facing the unit fuel cell; and a resin sheet that is interposed between the core plate and the cover plate, includes a third opening portion at a position corresponding to the manifold in the arrangement state, and is arranged at a position facing the manifold forming area, wherein the core plate includes a first metal plate that is arranged at a position facing the power generating area in the arrangement state, and a second metal plate that is joined to the first metal plate, includes the first opening portion, and is arranged at a position facing the manifold forming area in the arrangement state, each of the cover plate and the second metal plate is made of a metal material higher in corrosion resistance than the first metal plate, and the first metal plate and the second metal plate are coplanar.

2. The terminal plate for fuel cell according to claim 1, wherein the cover plate and the second metal plate are made of a same metal material.

3. The terminal plate for fuel cell according to claim 1, further comprising:

a spacer having conductivity that is interposed between the core plate and the cover plate and is arranged at a position facing the power generating area in the arrangement state.

4. The terminal plate for fuel cell according to claim 3, wherein the spacer and the first metal plate are made of a same metal material.

5. The terminal plate for fuel cell according to claim 1, wherein
the first metal plate includes a through hole in a vicinity of the second metal plate.

* * * * *